(12) United States Patent
Guan

(10) Patent No.: US 11,256,911 B2
(45) Date of Patent: Feb. 22, 2022

(54) STATE RECOGNITION APPARATUS, STATE RECOGNITION METHOD, AND NON-TRANSITORY COMPUTER-READABLE MEDIUM STORING PROGRAM

(71) Applicant: Haike Guan, Kanagawa (JP)

(72) Inventor: Haike Guan, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/030,391

(22) Filed: Sep. 24, 2020

(65) Prior Publication Data

US 2021/0150198 A1 May 20, 2021

(30) Foreign Application Priority Data

Nov. 14, 2019 (JP) .............................. JP2019-206472

(51) Int. Cl.
| | | |
|---|---|---|
| *G06K 9/00* | (2006.01) | |
| *G06T 7/215* | (2017.01) | |
| *G06K 9/62* | (2022.01) | |

(52) U.S. Cl.
CPC ..... *G06K 9/00369* (2013.01); *G06K 9/00348* (2013.01); *G06K 9/00744* (2013.01); *G06K 9/6215* (2013.01); *G06T 7/215* (2017.01); *G06T 2207/10016* (2013.01)

(58) Field of Classification Search
CPC ........... G06K 9/00369; G06K 9/00348; G06K 9/00744; G06K 9/6215; G06T 7/215
USPC ........................................................... 382/103
See application file for complete search history.

(56) References Cited

U.S. PATENT DOCUMENTS

| | | | |
|---|---|---|---|
| 2016/0227104 A1 | 8/2016 | Guan et al. | |
| 2017/0228606 A1 | 8/2017 | Guan | |
| 2017/0330455 A1 | 11/2017 | Kikuchi et al. | |
| 2019/0303680 A1 | 10/2019 | Guan | |
| 2019/0311513 A1* | 10/2019 | Han | ...................... H04L 67/306 |

FOREIGN PATENT DOCUMENTS

| | | |
|---|---|---|
| JP | 2011-100175 | 5/2011 |
| JP | 2018-148843 | 9/2018 |
| JP | 2019-175268 | 10/2019 |

\* cited by examiner

*Primary Examiner* — Ayodeji O Ayotunde
(74) *Attorney, Agent, or Firm* — Xsensus LLP

(57) ABSTRACT

A state recognition apparatus includes circuitry configured to: recognize a monitoring target based on a captured image; recognize a motion of each part of the recognized monitoring target; recognize a state of the monitoring target based on the recognized motion of each part; and output a state recognition result indicating the recognized state of the monitoring target.

11 Claims, 13 Drawing Sheets

STATE RECOGNITION APPARATUS, STATE RECOGNITION METHOD, AND NON-TRANSITORY COMPUTER-READABLE MEDIUM STORING PROGRAM

CROSS-REFERENCE TO RELATED APPLICATION

This patent application is based on and claims priority pursuant to 35 U.S.C. § 119(a) to Japanese Patent Application No. 2019-206472, filed on Nov. 14, 2019, in the Japan Patent Office, the entire disclosure of which is hereby incorporated by reference herein.

BACKGROUND

Technical Field

The present disclosure relates to a state recognition apparatus, a state recognition method, and a non-transitory computer-readable medium storing program.

Description of the Related Art

For example, an action recognition apparatus is known that photographs actions or motions of a monitoring target such as persons, animals, or work machines by a camera device, and analyzes the photographed image, to visualize and recognize the action of the persons, animals, work machines, etc.

For example, a person action determination device is known that determines the action of a person included in a crowded scene only by video processing. Such person action determination device detects a trajectory of a center of gravity as a feature amount based on a position of the center of gravity and the trajectory of the center of gravity of a person who is identified as an identical person by video processing. Further, the device compares the detected feature amount with a pre-registered trajectory feature amount for each action, to determine the action of the person.

SUMMARY

According to one or more embodiments, a state recognition apparatus includes circuitry configured to: recognize a monitoring target based on a captured image; recognize a motion of each part of the recognized monitoring target; recognize a state of the monitoring target based on the recognized motion of each part; and output a state recognition result indicating the recognized state of the monitoring target.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
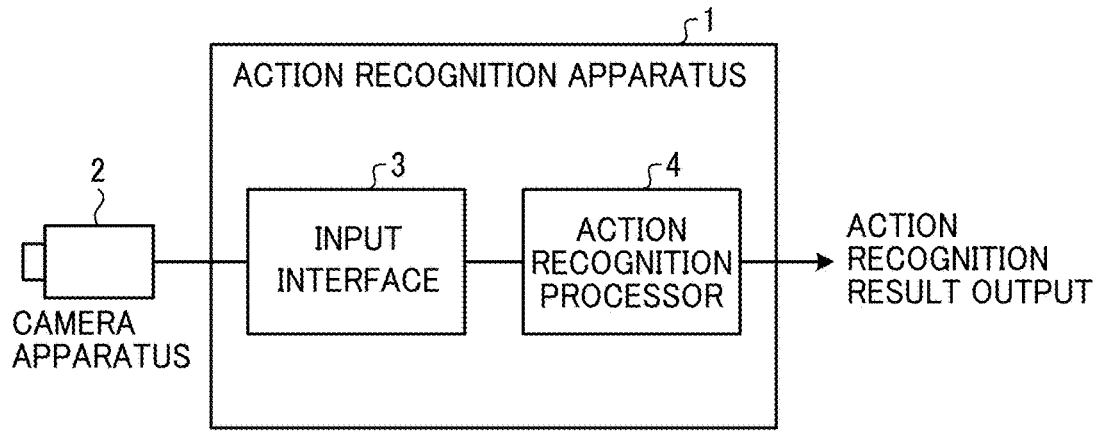
FIG. 1 is a block diagram illustrating an example of a configuration of an action recognition system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A description is given hereinafter of several embodiments of an action recognition system as an example to which a state recognition apparatus, a state recognition method, and a non-transitory computer-readable medium storing a state recognition program are applied.

System Configuration:

FIG. 1 is a block diagram illustrating an example of a configuration of an action recognition system, according to an embodiment. As illustrated in FIG. 1, the action recognition system includes an action recognition apparatus 1 and a camera apparatus 2. The camera apparatus 2 photographs a monitoring target such as a single person, animal, and robot or a plurality of persons, animals, and robots.

The action recognition apparatus 1 further includes an input interface 3 and an action recognition processor 4. The input interface 3 acquires a captured image of the monitoring target from the camera apparatus 2. The action recognition processor 4 recognizes the action (movement) of the monitoring target based on the captured image acquired through the input interface 3 and outputs the action recognition result to an external device such as a monitor device viewed by a monitor.

Figure 2:
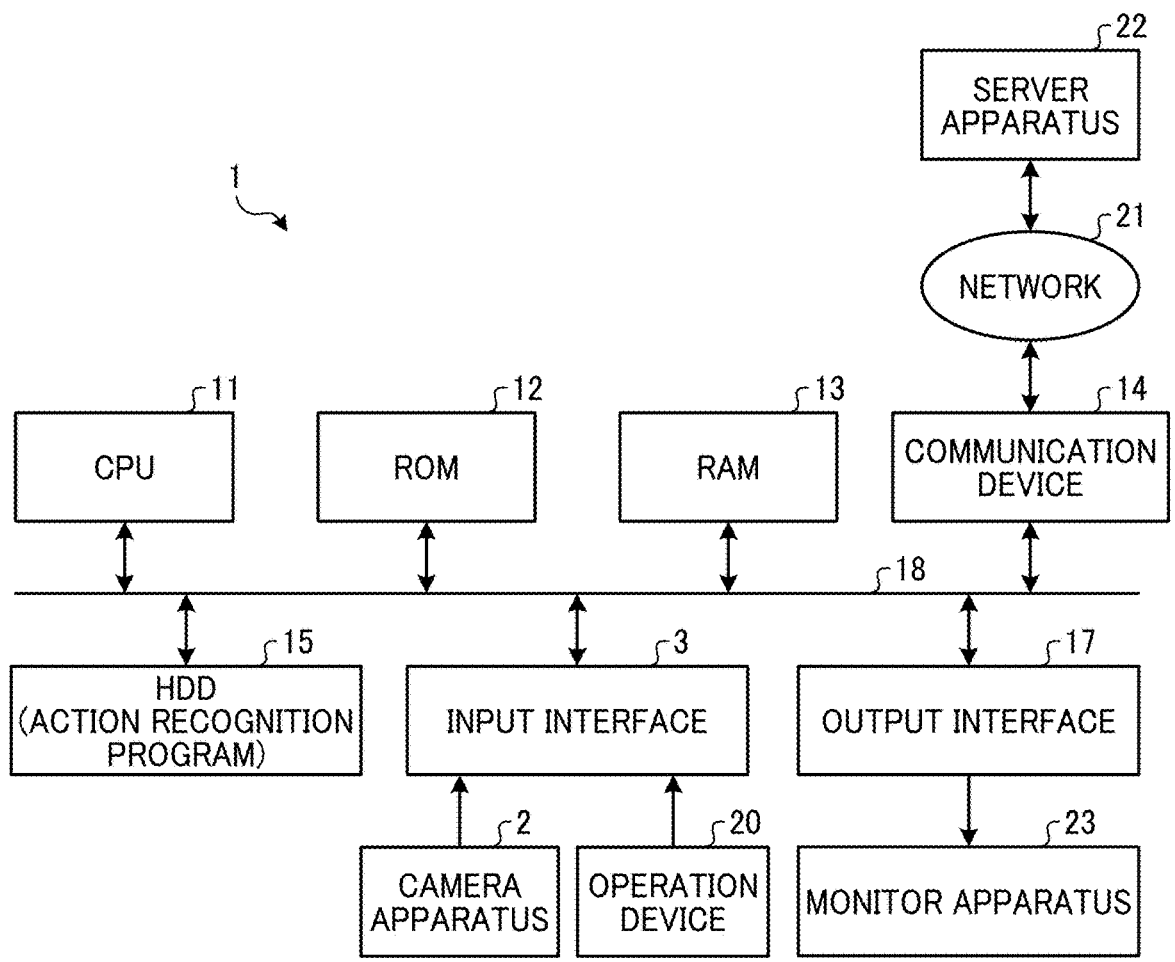
FIG. 2 is a block diagram illustrating an example of a hardware configuration of an action recognition apparatus of the action recognition system, according to an embodiment of the present disclosure.

Hardware Configuration of Action Recognition Apparatus:

FIG. 2 is a block diagram illustrating an example of a hardware configuration of the action recognition apparatus 1. As illustrated in FIG. 2, the action recognition apparatus 1 includes a central processing unit (CPU) 11, a read only memory (ROM) 12, a random access memory (RAM) 13, a communication device 14, a hard disk drive (HDD) 15, the input interface 3, and an output interface 17. These hardware components 3, 11 to 15, and 17 are mutually connected through a bus line 18.

To the input interface 3, an operation device 20 such as a keyboard device and a mouse device is connected, in addition to the camera apparatus 2. To the output interface 17, a monitor apparatus 23 (display unit) configured to display the action recognition result is connected. In another example, the action recognition result may be output to an external storage device such as an HDD or a semiconductor memory through the output interface 17.

To the communication device 14, a server apparatus 22 is connected through a network such as a wide area network such as the Internet or a private network such as a local area network (LAN). The communication device 14 transmits the action recognition result to the server apparatus 22, and the server apparatus 22 stores the received action recognition result. Thus, an administrator or the like accesses the server apparatus 22 via a communication apparatus such as a smartphone, a tablet terminal device, a personal computer, to acquire the action recognition result, whereby remotely monitoring the monitoring target.

In the HDD 15, an action recognition program for performing an action recognition process of the monitoring target. The CPU 11 implements each function described below by executing this action recognition program, and performs the action recognition process of the monitoring target.

Figure 3:
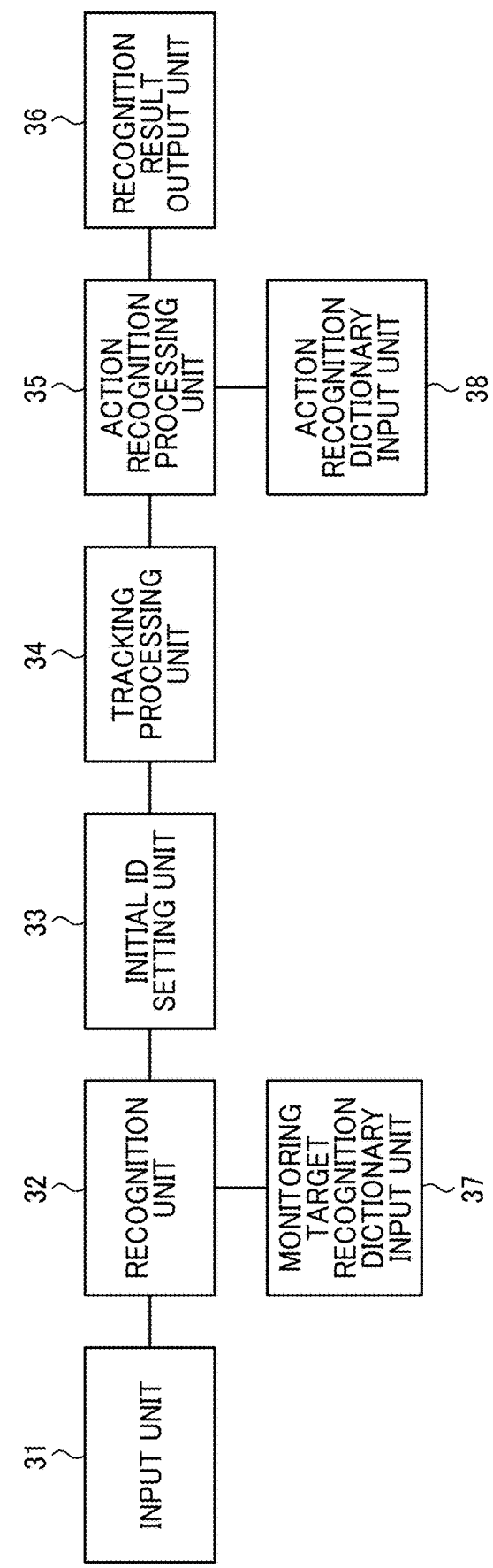
FIG. 3 is a block diagram illustrating an example of a functional configuration of the action recognition apparatus, according to an embodiment of the present disclosure.

Action Recognition Functions:

FIG. 3 is a block diagram illustrating a functional configuration of functions implemented by the CPU 11 executing the action recognition program. As illustrated in FIG. 3, the CPU 11 executes the action recognition program to implement an input unit 31, a recognition unit 32, an initial identification number setting unit (initial ID setting unit) 33, a tracking processing unit 34, an action recognition processing unit 35, a recognition result output unit 36, a monitoring target recognition dictionary input unit 37, and an action recognition dictionary input unit 38. The initial ID setting unit 33 is an example of an identification number setting unit. The action recognition processing unit 35 is an example of a motion recognition processing unit and a state recognition processing unit.

Although the description given above is of an example in which the input unit 31 to the action recognition dictionary input unit 38 are implemented, the embodiment is not limited thereto. In another example, some or all of the functions can be implemented by hardware such as an integrated circuit (IC).

In another example, the action recognition program may be stored in a computer-readable storage medium such as a compact disc read only memory (CD-ROM) and a flexible disk (FD), in an installable or executable file format, for distribution. In still another example, the action recognition program may be stored in a computer-readable storage medium such as a compact disc-recordable (CD-R), a digital versatile disk (DVD), a Blu-ray Disc (registered trademark), and a semiconductor memory, for distribution. In still another example, the action recognition program may be installed via a network such as the Internet or may be provided as being preloaded in a ROM, etc., of the apparatus.

Figure 4:
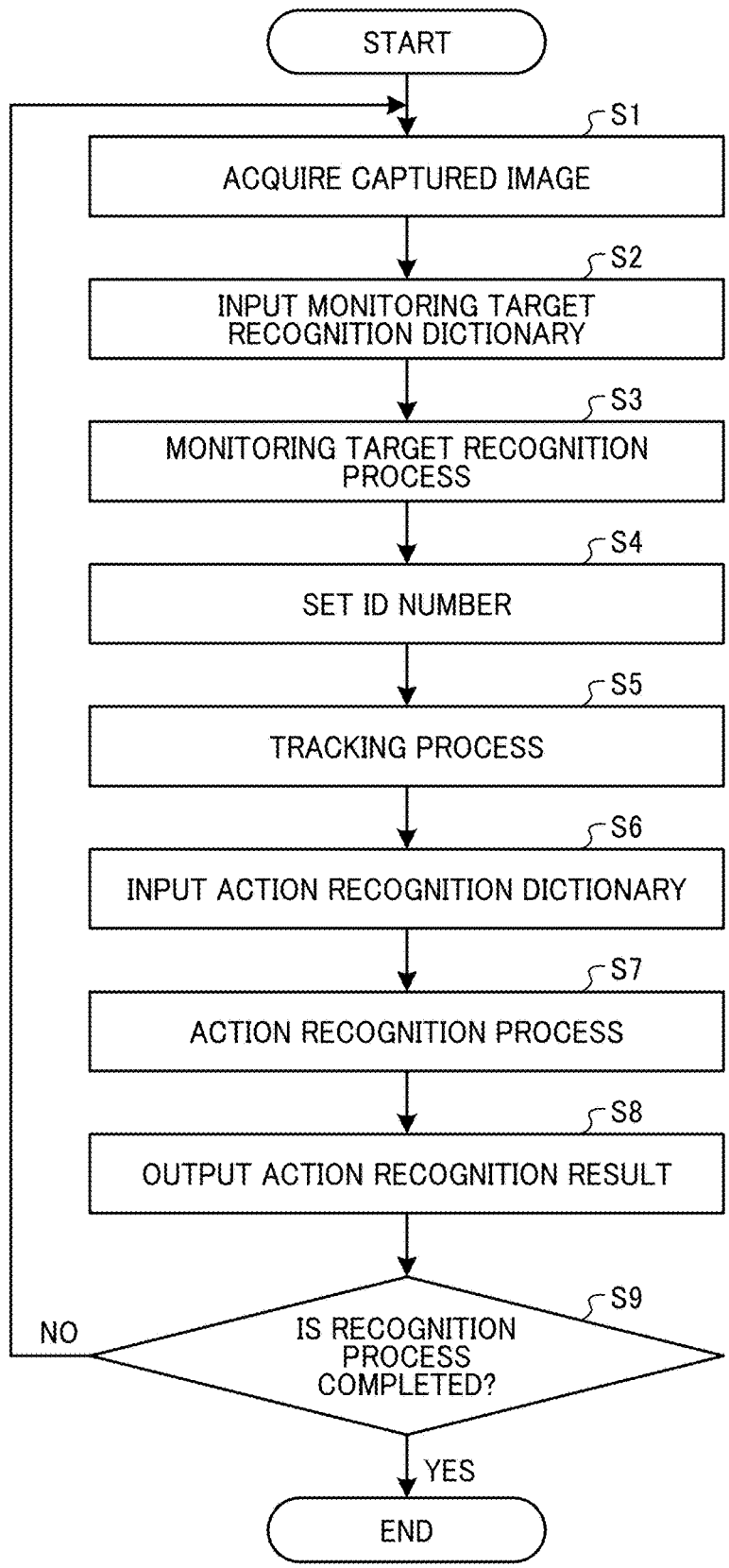
FIG. 4 is a flowchart illustrating steps in operation of recognizing an action of a monitoring target, performed by the action recognition apparatus, according to an embodiment of the present disclosure.

Action Recognition Operation:

A description is now given of an action recognition operation of the monitoring target performed by the input unit 31 to the action recognition dictionary input unit 38, with reference to the flowchart of FIG. 4. The CPU 11 reads the action recognition program, to execute the operation as illustrated in the flowchart of FIG. 4.

First, the input unit 31 acquires a captured image from the camera apparatus 2 (step S1). This captured image is obtained by, for example, capturing a work situation in which one or a plurality of workers, who are an example of the monitoring target, put products in a workplace on a shelf.

Next, the monitoring target recognition dictionary input unit 37 inputs a monitoring target recognition dictionary, which is for recognizing the worker, to the recognition unit 32 (step S2). The monitoring target recognition dictionary is a dictionary (data group) indicating a feature amount for calculating an evaluation value of each layer by the recognition unit 32, a weighting factor, and a threshold value of the evaluation for each layer. This monitoring target recognition dictionary is formed by learning beforehand, for a captured image of human and for a captured image of an object other than human, vertex position coordinates of a rectangle for calculating the feature amount described below, the weighting factor, and the evaluation threshold value for each layer, which will be described below.

Figure 5:
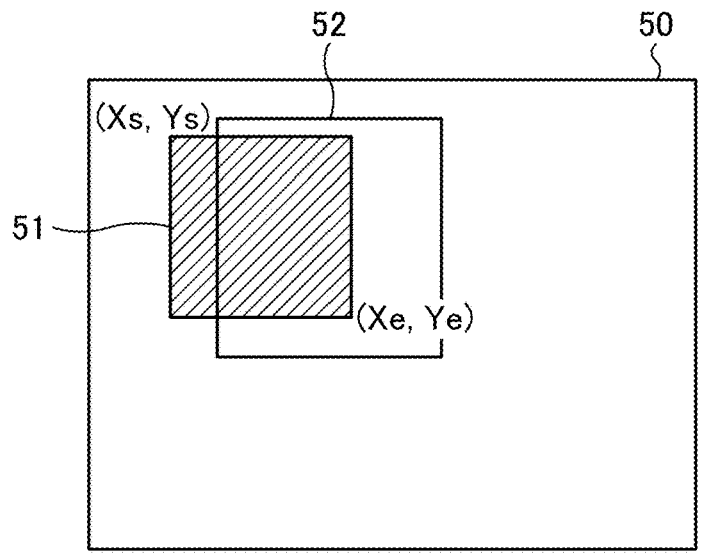
FIG. 5 is a diagram for describing an operation of recognizing a worker performed by a recognition unit of the action recognition apparatus, according to an embodiment of the present disclosure.
Figure 6A:
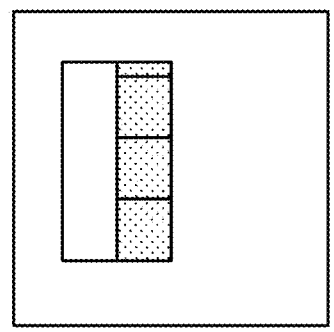
FIGS. 6A to 6D are diagrams for describing a computation process of a feature amount, performed by the recognition unit of the action recognition apparatus, according to an embodiment of the present disclosure.
Figure 6B:
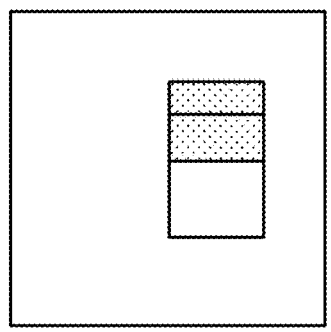
Figure 6C:
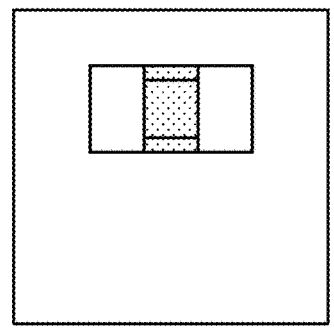
Figure 6D:
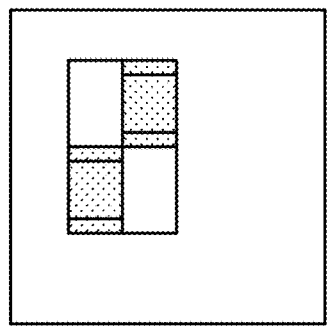

Next, the recognition unit 32 refers to the monitoring target recognition dictionary, to recognize the worker included in the captured image acquired by the input unit 31 (step S3). FIG. 5 is a diagram for describing an operation of recognizing the worker performed by the recognition unit 32. As illustrated in FIG. 5, the recognition unit 32 cuts out blocks 51, 52 . . . , each having a predetermined shape, such as a rectangular shape, within a captured image 50. The upper left coordinates (Xs, Ys) of the block 51 and the lower right coordinates (Xe, Ye) of the block 51 are determined by the position of the block 51 in the captured image 50 and the size of the rectangle.

The recognition unit 32 selects the blocks 51 etc., in order from the largest size to the smallest size and computes the feature amount and the like described below. In other words, the processing time of the large block and the processing time of the small block are the same. Further, in the captured image 50, the number of large blocks is smaller than the number of small blocks. For this reason, the recognition unit 32 selects blocks in order from the largest block to the smallest block, to compute the feature amount and the like. This enables quick detection of the object (monitoring target).

FIG. 6A to FIG. 6D are diagrams for describing a computation process of the feature amount. As illustrated in FIG. 6A to FIG. 6D, the recognition unit 32 refers to the input monitoring target recognition dictionary, to add a pixel value in a white area to a rectangular area of black and white in the block. Further, the recognition unit 32 calculates a difference from the total pixel value in the black pixel area as the feature amount h(x) in the block. Furthermore, the recognition unit 32 performs processing on the feature amount h(x) with a predetermined weight, to calculate an evaluation value f(s).

The following equation (1) is an arithmetic expression of the evaluation value f(x).

Equation (1):

Equation (1)

$$f(x) = \sum_{t=1}^{T} \alpha_t h_t(x) \quad (1)$$

Figure 7:
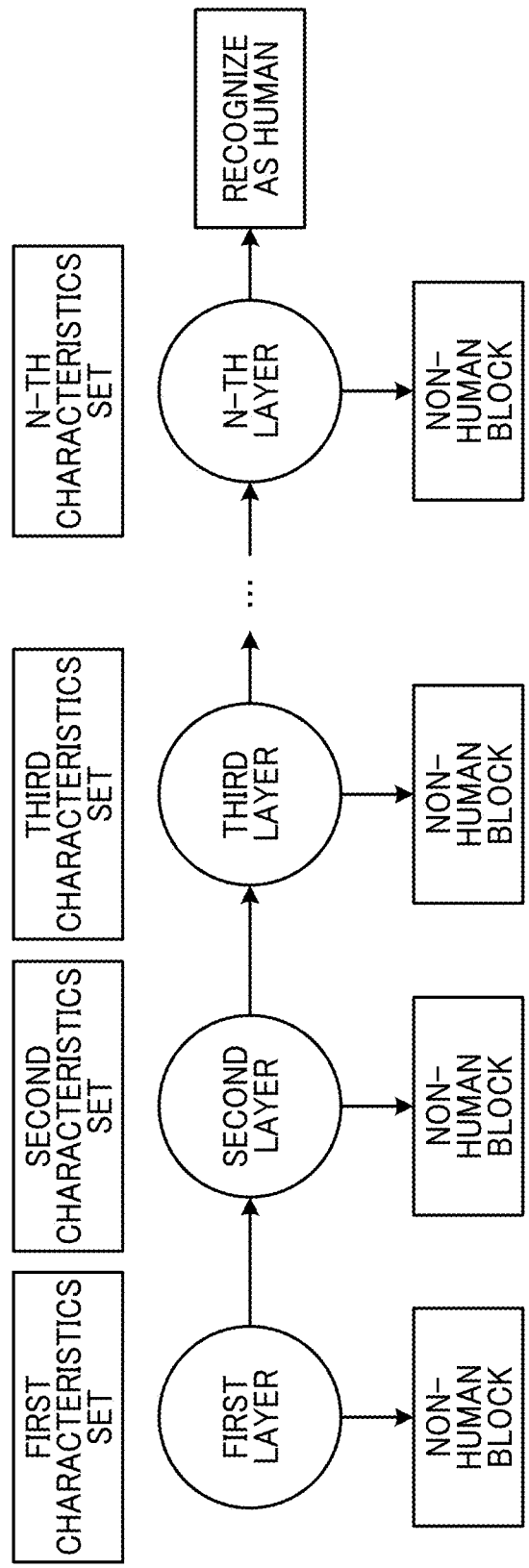
FIG. 7 is a diagram illustrating a layer structure of a recognition process of the worker, performed by the recognition unit of the action recognition apparatus, according to an embodiment of the present disclosure.

The recognition unit 32 calculates the evaluation value f(x) for each layer such as the first layer to the n-th layer (n is a natural number) as illustrated in FIG. 7. When the calculated evaluation value f(x) is smaller than the pre-set threshold value indicated in the monitoring target recognition dictionary, the recognition unit 32 identifies the block as a block including an object other than human (a non-human block), and stops the evaluation of the block. By contrast, when the calculated evaluation value f(x) is equal to or larger than the pre-set threshold value indicated in the monitoring target recognition dictionary, the recognition unit 32 identifies the block as a block including a human.

Figure 8:
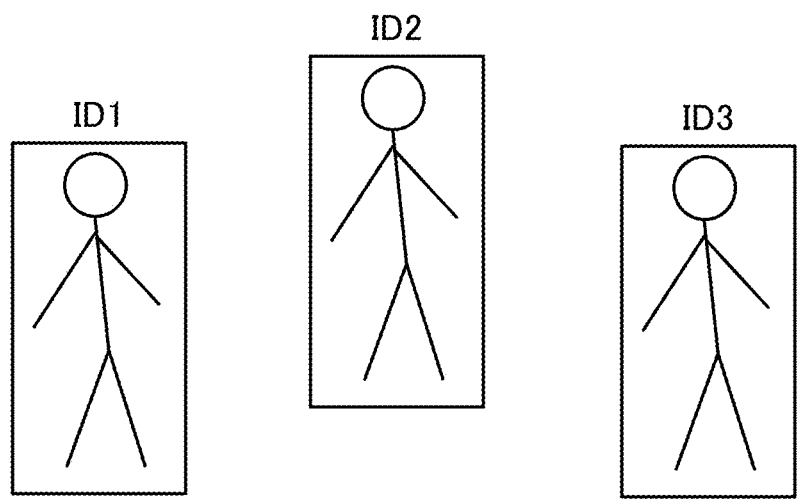
FIG. 8 is a diagram illustrating IDs assigned by an initial ID setting unit of the action recognition apparatus for each of recognized workers, according to an embodiment of the present disclosure.

When the block including the human is recognized in this way, the initial ID setting unit 33 assigns an identification number to each block (step S4). In the example of FIG. 8, three blocks are recognized as blocks each including a human, and the initial ID setting unit 33 assigns identification numbers ID1, ID2, and ID3 to the three blocks (initial areas) respectively.

Figure 9:
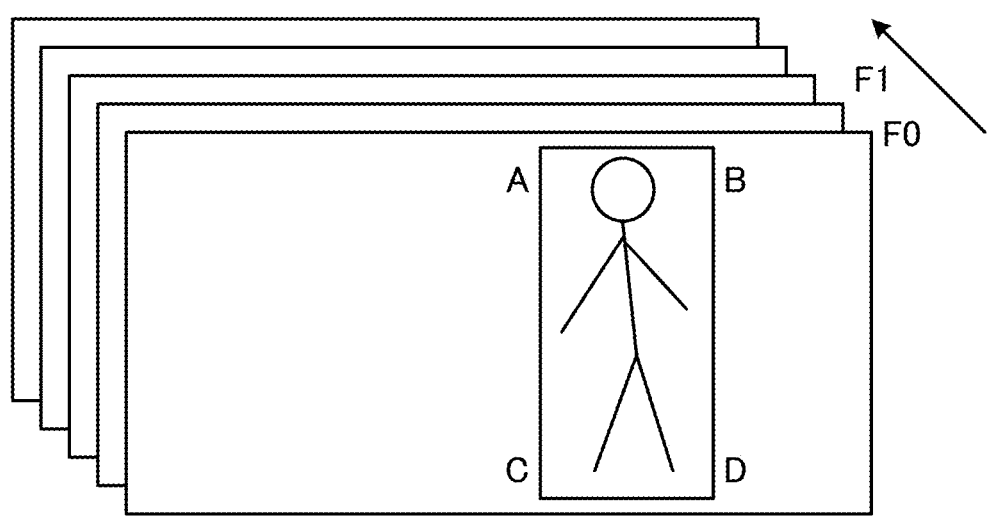
FIG. 9 is a diagram illustrating captured images of the worker, which are successively input to a tracking processing unit of the action recognition apparatus, according to an embodiment of the present disclosure.

Next, the tracking processing unit 34 tracks a worker included in each block (step S5). Specifically, as illustrated in FIG. 9, the tracking processing unit 34 is successively (in chronological order) supplied with the captured images acquired via the input unit 31. For example, the tracking processing unit 34 is supplied with a first frame F0, and then supplied with the next frame F1 after Δt time.

The tracking processing unit 34 defines a state "S (x, y, vx, vy, Hx, Hy, M)" of the worker in the first frame. x and y are the coordinate values of the upper left point A of the block in which the worker (tracking target) is included, the block being indicted by a rectangular frame in FIG. 9. Hx and Hy respectively indicate a horizontal size and a vertical size of the block including the worker. vx and vy respectively indicate the speeds at which the worker in the block moves in the horizontal and vertical directions. The initial values of vx and vy are set to 0. M is a change in a scaling factor of the worker in the block (size change rate of the worker with respect to the previous frame). The initial value of M is set to 0.

Figure 10:
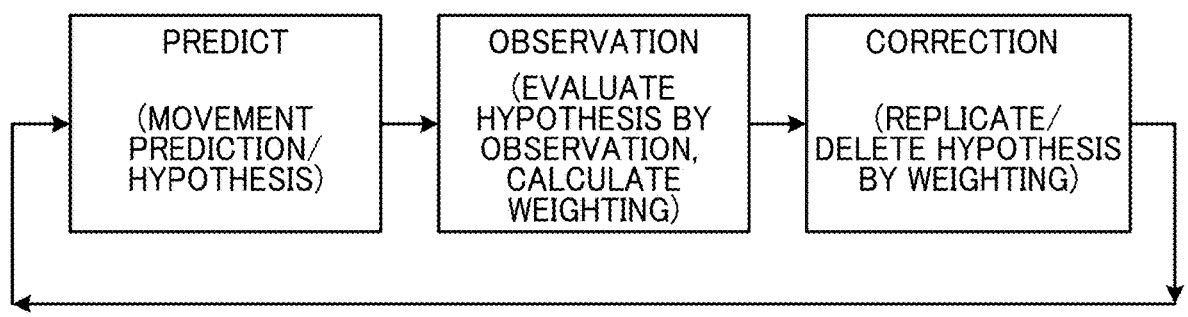
FIG. 10 is a diagram for describing a tracking operation performed by a tracking processing unit of the action recognition apparatus, according to an embodiment of the present disclosure.
Figure 11:
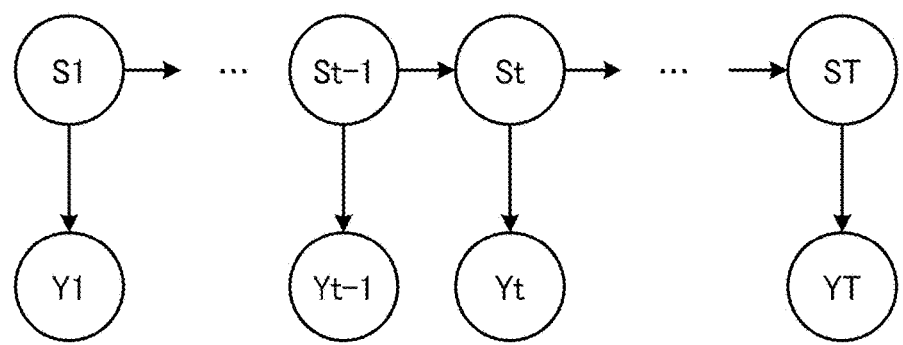
FIG. 11 is another diagram for describing the tracking operation performed by the tracking processing unit of the action recognition apparatus, according to an embodiment of the present disclosure.

As illustrated in FIG. 10 and FIG. 11, the tracking processing unit 34 tracks the worker by repeatedly performing prediction, observation, and correction of the worker's state. "St" illustrated in FIG. 11 indicates the worker (tracking target) state at time t. "Yt" indicates the observation result at time t.

The tracking processing unit 34 calculates the state change from the state $S_{k-2}$ to the state $S_k$ of the worker by computing the following equation (2).

Equation (2):

$$S_k = f_k(S_{k-1}, v_{k-1}) \quad (2)$$

The tracking processing unit 34 computes the following equations (3) to (9), to predict a next state k of the worker from a state k−1 of the worker.

Equation (3):

$$x_k = x_{k-1} + V_{xk-1} * \Delta t \quad (3)$$

Equation (4):

$$y_k = y_{k-1} + V_{yk-1} * \Delta t \quad (4)$$

Equation (5):

$$V_{xk} = V_{xk-1} \quad (5)$$

Equation (6):

$$V_{yk} = V_{yk-1} \quad (6)$$

Equation (7):

$$M_k = M_{k-1} \tag{7}$$

Equation (8):

$$H_{xk} = H_{xk-1}(1+M_{k-1}) \tag{8}$$

Equation (9):

$$H_{yk} = H_{yk-1}(1+M_{y-1}) \tag{9}$$

Next, the tracking processing unit 34 computes the following equation (10), to calculate observation data $Z_k$ of the worker's state $S_k$.

Equation (10):

$$z_k = h_k(S_k, n_k) \tag{10}$$

The observation data is a color histogram of the worker in the block (in an area where the tracking target is included) illustrated in FIG. 9. The tracking processing unit 34 computes the following equation (11). In the equation (11), k( ) is a kernel for calculating the color histogram. Further, in the equation (11), a is a scaling factor and h(xi) is a color pixel value. P is a frequency of the color histogram.

Equation (11)

$$p_y^{(u)} = f \sum_{i=1}^{I} k\left(\frac{\|y - x_i\|}{a}\right) \delta[h(x_i) - u] \tag{11}$$

The kernel k in the equation (11) is calculated by the following equation (12).

Equation (12)

$$k(r) = a \begin{cases} 1 - r^2: & r < 1 \\ 0: & \text{otherwise} \end{cases} \tag{12}$$

By using the kernel k calculated by the equation (12), the closer to the center of the block (subject area), the larger value is calculated, and the closer to the periphery of the block, the smaller value is calculated. This reduces influences due to the periphery of the block (subject area).

Figure 12:
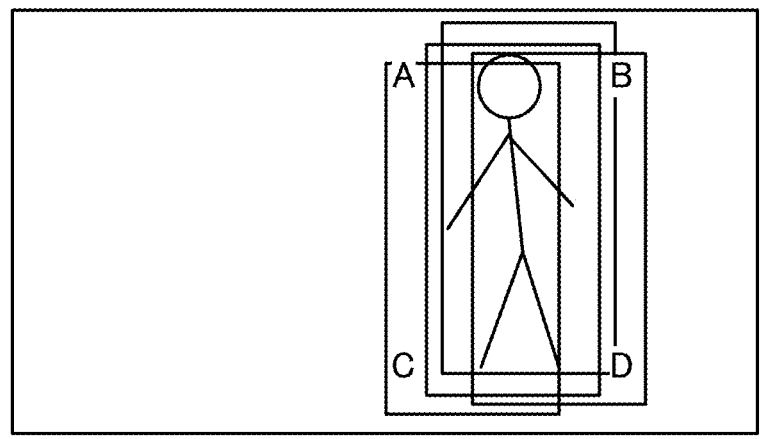
FIG. 12 is a diagram for describing an operation of evaluating a feature amount of a prediction region of the worker to obtain a weighting factor, performed by the tracking processing unit of the action recognition apparatus, according to an embodiment of the present disclosure.

Next, the tracking processing unit 34 computes the following equation (13), to observe a prediction state $S_k^{(i)}$, and calculates a weighted average of observation result evaluations. In this calculation, the tracking processing unit 34 evaluates the feature amounts of the N number of prediction areas as indicated by a plurality of frames in FIG. 12, to obtain weighting factors. The weighted average of the obtained weighting factors is a tracking result.

Equation (13)

$$S_k = \sum_{i=1}^{N} \pi^i f_k S_k^{(i)} \tag{13}$$

More specifically, the tracking processing unit 34 computes the following equations (14) to (20), which are obtained by adding random variables to the above equations (3) to (9), to predict the state $S_k$ of the worker. For example, Gaussian random variables are used as r to $r_7$.

Equation (14):

$$x_k = x_{k-1} + V_{xk-1} * \Delta t + r_1 \tag{14}$$

Equation (15):

$$y_k = y_{k-1} + V_{yk-1} * \Delta t + r_2 \tag{15}$$

Equation (16):

$$V_{xk} = V_{xk-1} + r_3 \tag{16}$$

Equation (17):

$$V_{yk} = V_{yk-1} + r_4 \tag{17}$$

Equation (18):

$$M_k = M_{k-1} + r_5 \tag{18}$$

Equation (19):

$$H_{xk} = H_{xk-1}(1+M_{k-1}) + r_6 \tag{19}$$

Equation (20):

$$H_{yk} = H_{yk-1}(1+M_{k-1}) + r_7 \tag{20}$$

Next, the tracking processing unit 34 calculates a weighting factor $\pi^i$ of the predicted state as follows. Specifically, first, the tracking processing unit 34 computes the following equation (21) as the color histogram q of the N number of prediction areas using the histogram P calculated from the tracking area of the worker as a model, to calculate the Bhattacharyya coefficient.

Equation (21)

$$\rho[p, q] = \sum_{u=1}^{m} \sqrt{p^{(u)} q^{(u)}} . \tag{21}$$

The Bhattacharya coefficient indicates the degree of similarity between the color histogram (=model) of the tracking area of the worker and the color histogram of the predicted area. Therefore, when the value of the Bhattacharya coefficient is large, it means that the two color histograms have high similarity. The tracking processing unit 34 computes the following equation (22), to calculate the weighting factor $\pi_i$ of the predicted state using this Bhattacharya coefficient.

Equation (22)

$$\pi^{(n)} = \frac{1}{\sqrt{2\pi}\,\sigma} e^{-\frac{d^2}{2\sigma^2}} = \frac{1}{\sqrt{2\pi}\,\sigma} e^{-\frac{(1-\rho[p_s(n),q])}{2\sigma^2}} \tag{22}$$

Note that "d" in the equation (22) is calculated by the following equation (23).

Equation (23):

$$d = \sqrt{1 - \rho[p,q]} \tag{23}$$

The tracking processing unit 34 computes the above equation (13) using the weighting factor $\pi^i$ calculated as described above and the predicted state $S^i_k$, to calculate a tracking result of the worker.

Next, the tracking processing unit 34 sets the similarity ρ[p,q] of the tracking result indicated by the Bhattacharya coefficient calculated by computing the above equation (21) as a certainty factor of the tracking of the worker. The certainty factor takes a value from 0 to 1.0. The higher the value of ρ[p,q], the higher the certainty factor.

When the certainty factor is equal to or greater than a predetermined threshold value set in advance, the tracking processing unit 34 determines that the tracking is successful, and therefore keeps the ID of each worker illustrated in FIG. 8 unchanged. Further, for example, the tracking processing unit 34 stores position information (=rectangular information) of the worker who is identified as being successfully tracked and image data of the rectangular area of the worker in a memory as worker information. When image information of the next frame is input, the tracking processing unit 34 performs the above-described tracking process. When the tracking is successful, the worker ID is maintained, and the worker information stored in the memory is updated.

During the tracking of the workers as described above, there is a case where the workers overlap each other, the worker moves behind an object, or the worker moves out of an imaging range of the camera apparatus 2, and therefore the worker who has been tracked disappears or becomes difficult to be detected from the captured image. Thus, the tracking the worker becomes difficult. In this case, it is difficult to acquire data of the worker having the ID, who disappears or difficult to detect.

Note that "when tracking becomes difficult" is synonymous with "when tracking is not possible", "when tracking is interrupted, or "when tracking is not performed correctly", and the like.

As described above, when the tracking of the worker is successful, the tracking processing unit 34 maintains the ID of the worker who is being tracked, and updates the worker information in the memory. By contrast, when the tracking becomes difficult, the tracking processing unit 34 maintains the ID and the worker information detected in a frame in which the tracking succeeds last of the worker who becomes difficult to be tracked. For example, in the example of FIG. 8, when the tracking of the worker to whom ID 3 is assigned becomes difficult, the tracking processing unit 34 maintains the ID 3 and worker information of the worker detected in the frame in which the tracking succeeds last.

When the tracking of the worker becomes difficult, the recognition unit 32 performs the recognition process for each worker again, and assigns the ID to each worker again. When assigning the ID to each user again, the ID which was assigned to the worker who becomes difficult to be tracked is assigned to the worker having the similarity closest to the similarity of the worker who becomes difficult to be tracked from among the workers who are re-recognized. Thus, the same ID is assigned to the same worker.

Specifically, such reassigning operation of the ID is performed as follows. When the tracking of a given worker becomes difficult, the recognition unit 32 performs a re-recognition process of workers again based on the captured image acquired via the input unit 31. In this example, it is assumed that three workers A, B, and C are recognized by this re-recognition process.

The initial ID setting unit 33 computes the above equation (21), to obtain the similarity of each of the three workers A, B, and C who are re-recognized, and the similarity (the Bhattacharya coefficient) of the worker identified by the ID 3 that was maintained when tracking became difficult. Then, the initial ID setting unit 33 assigns "ID 3" to a particular worker among the three workers A, B, and C, the particular worker having the closest similarity to the similarity of the worker identified by ID 3 maintained when tracking became difficult. Thus, when a given worker who was once difficult to be tracked becomes a state in which the given worker can be detected again, the same ID as the ID that was assigned when the tracking became difficult is assigned to the given worker, and the tracking is continued.

In substantially the same manner, for example, when the tracking of the two workers to whom ID 1 and ID 2 are assigned respectively became difficult, the initial ID setting unit 33 assigns "ID 1" to a particular worker among the three workers A, B, and C, the particular worker having the closest similarity to the similarity of the worker identified by the ID 1 maintained when tracking became difficult. Further, the initial ID setting unit 33 assigns "ID 2" to a particular worker among the three workers A, B, and C the particular worker having the closest similarity to the similarity of the worker identified by the ID 2 maintained when tracking became difficult. This enable track the workers using the same IDs even after the re-recognition.

Next, the action recognition processing unit 35 performs an action recognition process of a worker based on an action recognition dictionary for recognizing an action of a worker, which is input from the action recognition dictionary input unit 38 in step S6 of the flowchart of FIG. 4 (step S7).

Figure 13:
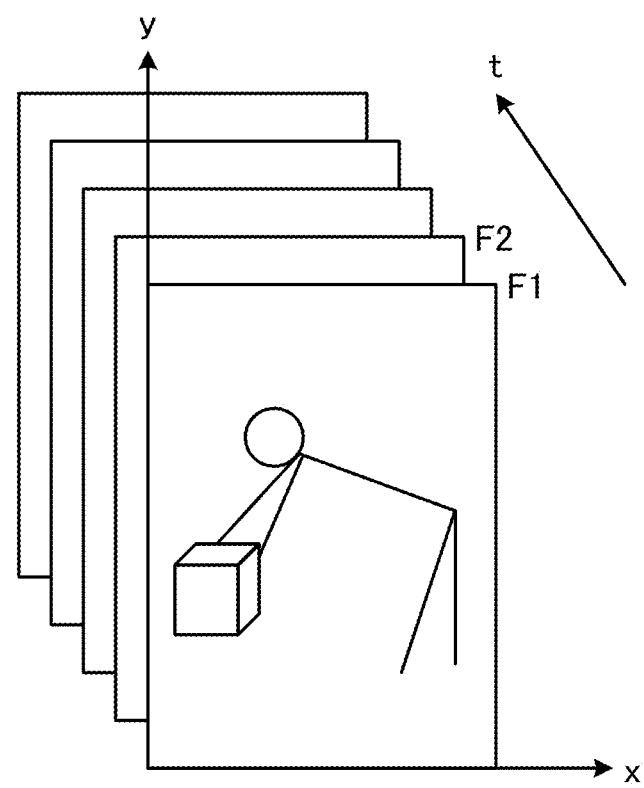
FIG. 13 is a diagram illustrating a captured image of a plurality of frames of the worker, the captured image being input from a camera apparatus to the action recognition apparatus, according to an embodiment of the present disclosure.

Specifically, as illustrated in FIG. 13, the action recognition processing unit 35 extracts spatiotemporal features of rectangular areas including a worker in a plurality of frames input via the input unit 31. A horizontal axis x and a vertical axis y of each frame illustrated in FIG. 13 are spatial coordinates. Further, FIG. 13 represents a situation in which frames F1, F2 . . . are arranged in a chronological order along a time axis t. That is, each frame is spatiotemporal (x, y, t) image data. Further, the one pixel value I (x, y, t) in the spatiotemporal space is a function of spatial coordinate (x, y) and a time t.

When the worker moves, a change point occurs in the spatiotemporal image data illustrated in FIG. 13. The action recognition processing unit 35 recognizes a specific action of the worker based on this change point (=spatiotemporal feature point). The action recognition processing unit 35 detects this change point (spatiotemporal feature point) as follows.

Figure 14:
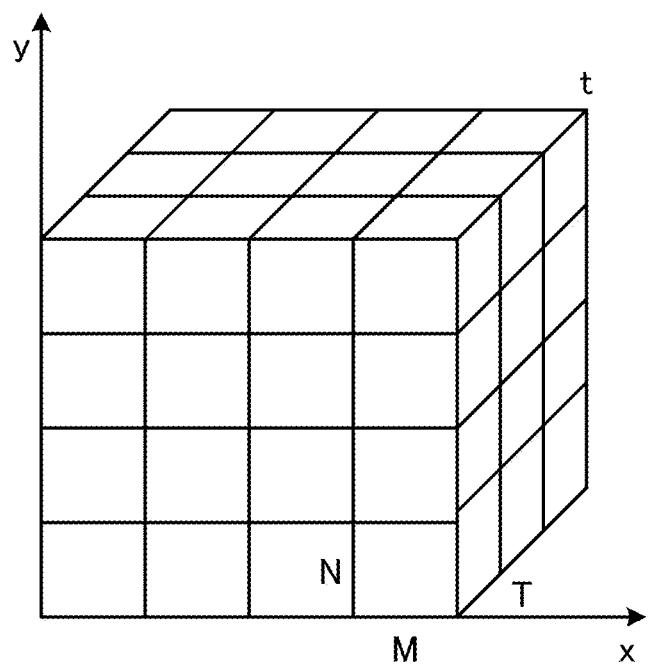
FIG. 14 is a diagram for describing spatiotemporal image data constituted as the capture image of the plurality of frames, according to an embodiment of the present disclosure.

FIG. 14 illustrates the spatiotemporal image data. A large cube illustrated in FIG. 14 is the spatiotemporal image data. The horizontal axis represents a spatial coordinate x (pixel), and the vertical axis represents a spatial coordinate y (pixel). The time axis t is, for example, a time series axis of captured images input at a predetermined frame rate such as thirty frames per second.

The action recognition processing unit 35 divides the spatiotemporal image data illustrated in FIG. 14 into blocks each having a size (M×N×T), i.e., M pixels in the x direction, N pixels in the y direction, and T frames in the t direction. When the worker performs a specific motion, the feature amount of the block corresponding to the motion of the worker in the spatiotemporal image data becomes large. In other words, a large amount of change occurs in the spatiotemporal space. The action recognition processing unit 35 extracts a particular block having a large amount of change as a feature point, as described below.

When extracting the feature point from the spatiotemporal image data, the action recognition processing unit 35 first performs a smoothing process on the spatiotemporal image data by computing the following Equation (24) in order to remove noise in a spatial direction (x, y).

Equation (24):

$$L(x,y,t) = I(x,y,t) * g(x,y) \qquad (24)$$

I (x, y, t) in the equation (24) represents the pixel value of the xy coordinates in a frame at the time t. Further, g (x, y) in the equation (24) represents a kernel for the smoothing process. The symbol "*" means that convolution process is performed. In one example, the smoothing process is performed by averaging pixels. In another example, the smoothing process is performed using a Gaussian smoothing filter.

Next, the action recognition processing unit 35 performs a filtering process, in a time axis, on the spatiotemporal image data on which the smoothing process is performed. As this filtering process, a Gabor filtering process indicated by the following equation (25) is performed.

Equation (25):

$$R(x,y,t) = (L(x,y,t) * g_{ev})^2 + (L(x,y,t) * g_{od})^2 \qquad (25)$$

"$G_{ev}$" and "$g_{od}$" in the equation (25) are kernels of the Gabor filter in the following equations (26) and (27), respectively. The symbol "*" means that convolution process is performed. "T" and "ω" are parameters of the kernel of the Gabor filter.

Equation (26):

$$g_{ev}(t;\tau,\omega) = -\cos(2\pi t\omega))e^{-t^2/\tau^2} \qquad (26)$$

Equation (27):

$$g_{od}(t;\tau,\omega) = -\sin(2\pi t\omega)e^{-t^2/\tau^2} \qquad (27)$$

Next, the action recognition processing unit 35 performs the filtering process indicated by the above equation (2) on all the pixels of the spatiotemporal image data illustrated in FIG. 13, and thereafter computes the following equation (28), to obtain an average value of the block divided as illustrated in FIG. 14.

Equation (28)

$$M(x, y, t) = \frac{\sum_{i=1}^{M}\sum_{j=1}^{N}\sum_{k=1}^{T} R(x+i, y+j, t+k)}{M \times N \times T} \qquad (28)$$

When the average value (M (x, y, t)) of the block obtained by the computation of the equation (28) is equal to or larger than a predetermined threshold value (Thre) as indicated in the following equation (29), the action recognition processing unit 35 extracts this block as the feature point.

Equation (29):

$$M(x,y,t) > Thre\_M \qquad (29)$$

Next, the action recognition processing unit 35 performs differential operation of the following equation (30), to obtain spatiotemporal edge information of pixels of the block that is extracted as the feature point from the spatiotemporal image data.

Equation (30)

$$E(x, y, t) = \left(\frac{\partial I}{\partial x}, \frac{\partial I}{\partial y}, \frac{\partial I}{\partial t}\right) \qquad (30)$$

In the example case illustrated in FIG. 14, since one block has the M×N×T number of pixels, the M×N×T×3 number of differential values are be obtained. Therefore, each block can be described by a vector of the M×N×T×3 number of differential values. In other words, the feature point is described by M×N×T×three-dimensional vector.

The action recognition dictionary input from the action recognition dictionary input unit 38 illustrated in FIG. 3 to the action recognition processing unit 35 is M×N×T×three-dimensional vector information calculated (learned) in advance by performing the computation of the equation (30) based on feature points detected from N frames of captured images obtained by capturing a specific action such as the worker carrying a baggage, walking, and placing the baggage on a shelf, for example.

When creating the action recognition dictionary, the action recognition dictionary input unit 38 uses, for example, the K-means clustering or the like, to classify the feature points, which are M×N×T×three-dimensional vectors, into K types of feature points, for example. By performing this classification process, the feature points having similar features are classified as feature points of the same type.

Next, for the K types of feature points obtained by the classification process, the action recognition dictionary input unit 38 averages M×N-T-three-dimensional edge vectors of the same type of the feature points, to calculate the K number of average vectors Vk. Each vector is a recognition vector that represents the feature points of the corresponding type. The feature points obtained from the captured image of the specific action of the worker are distributed near an average vector Vk obtained by learning data of the same specific action.

Using this characteristic, the action recognition dictionary input unit 38 calculates the total number of blocks for each of the K types of feature point groups, to calculate a recognition histogram H(k), which is a frequency of the feature point group. As described above, the distribution of the recognition target feature points is approximate to the distribution of the feature points of the learning data. For this reason, the recognition histogram of, for example, the worker as a recognition target is approximate to a learning histogram of the learning data of the same action (motion) of the worker. Therefore, the action recognition dictionary for recognizing the specific action of the worker or the like can be created using the histogram H(k) obtained from the learning data.

In one example, the action recognition dictionary is created using the machine learning method of support vector machine (SVM). When creating the action recognition dictionary with the SVM, the action recognition dictionary is created using positive learning data learned from captured images of the specific action of the worker as a recognition target and negative learning data learned from captured images of actions other than the specific action.

In another example, the action recognition dictionary is created using any other suitable machine learning methods such as K Nearest Neighbor or Multilayer Perceptron, in alternative to the SVM machine learning method.

To summarize the action recognition operation performed by the action recognition processing unit 35 described heretofore, the action recognition processing unit 35 extracts the above-mentioned spatiotemporal feature points from N-frame spatiotemporal image data input as a captured image (moving image) of the worker as the recognition target. The action recognition processing unit 35 obtains the M×N-T-three-dimensional differential vector of each feature point block. The action recognition processing unit 35 calculates the distance between the differential vector and the K number of learning average vectors Vk obtained from the input learning data, to classify the types of feature point blocks are into the types of the learning average vectors Vk having the shortest distance, respectively. The feature point blocks are classified into K types by classifying the feature point blocks in the above-described manner. The action recognition processing unit 35 creates a feature point histogram T(k) of the captured image (moving image) as the recognition target based on an appearance frequency of the feature point block of each type.

Further, the action recognition processing unit 35 performs the recognition process of the specific action of the worker by using the above SVM machine learning method, based on the action recognition dictionary input from the action recognition dictionary input unit 38 and the feature point histogram T(k) of the captured image as the recognition target. In the SVM recognition process using the SVM machine learning method, a recognition result of the specific action of the worker and a recognition result of actions other than the specific action are output.

The recognition result output unit 36 illustrated in FIG. 3 outputs the recognition result of the specific action of the worker and the recognition result of actions other than the specific action to the monitor apparatus 23 via the output interface 17 (step S8). This enables to monitor the monitoring target such as the worker via the monitor apparatus 23. In step S9 of the flowchart of FIG. 4, the CPU 11 determines whether the recognition process is completed. When the CPU 11 determines that the recognition process is not completed (step S9: No), the operation returns to step S1, and the above-described recognition process of the specific action of the worker is repeatedly performed. When the CPU 11 determines that the recognition process is completed (step S9: Yes), all the processes in the flowchart of FIG. 4 are completed.

The recognition result output unit 36 may transmit the recognition result to the server apparatus 22 through the communication device 14 and the network 21. In this case, an administrator or the like accesses the server apparatus 22 using a communication apparatus such as a smartphone, a tablet terminal device, or a personal computer device, to acquire the recognition result. This enables the administrator or the like to remotely monitor the monitoring target such as the worker.

Figure 15:
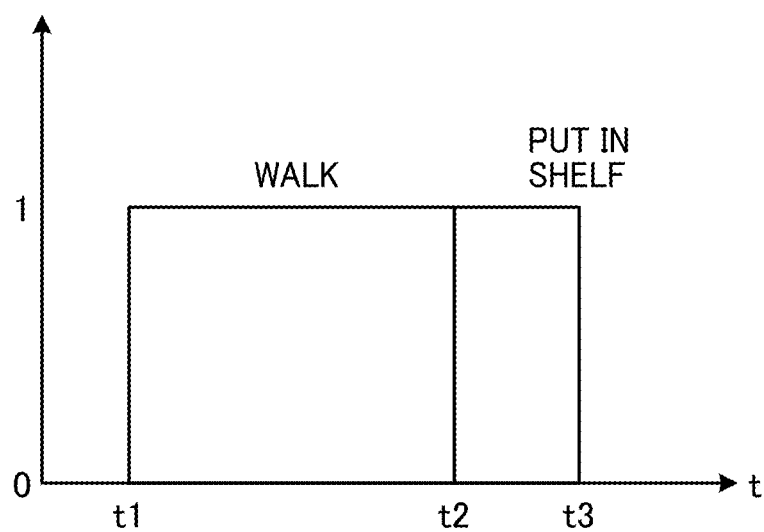
FIG. 15 is a diagram illustrating an example of an action recognition result of the worker recognized by an action recognition processing unit of the action recognition apparatus, according to an embodiment of the present disclosure.

A description is now given of how the recognition result is output by the recognition result output unit 36. In the following description, an action that the worker walks to a position where a shelf is located, and puts a product in a shelf while holding the product is described as an example of the recognition target. In this case, the recognition result output unit 36 outputs a start time and duration of the action based on the recognition result of the action of the worker recognized by the action recognition processing unit 35, as illustrated in FIG. 15. The difference (t2−t1) between a walking end time t2 and a walking start time t1 is a walking time.

Further, the difference (t3−t2) between an end time t3 of a shelving action and a start time t2 of the shelving action is a shelving action time. A shelving work time is the total time of the worker's walking time and the shelving action time, and is the difference (t3−t1) between the shelving end time t3 and the walking start time t1. The recognition result output unit 36 outputs, for each user, the walking time, the shelving action time, and the total time of the shelving work.

Figure 16:
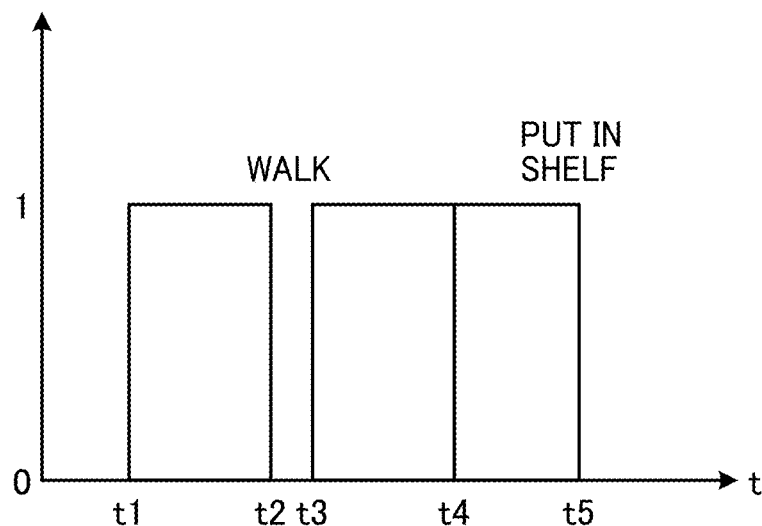
FIG. 16 is a diagram illustrating an example of an action recognition result in which it becomes difficult to detect the worker while the worker is walking among a series of actions from walking to putting an object in a shelf, according to an embodiment of the present disclosure.

Next, for example, when the worker overlaps with another worker or when the posture of the worker changes, and therefore it gets difficult to recognize the worker, the recognition process of the worker by the action recognition processing unit 35 is suspended. FIG. 16 illustrates an example in which when the worker performs the shelving work of a product, it becomes difficult to recognize the worker walking while the worker is walking. The difference between the time t3 and the time t2 illustrated in FIG. 16 indicates the time during which it is difficult to recognize the worker while the worker is walking.

In this case, the action recognition processing unit 35 determines whether the time difference between the time t3 and the time t2 indicating the time during which it is difficult to recognize the worker while walking is less than or equal to a threshold value Thre_w. It often happens that the recognition of the worker becomes temporarily difficult, e.g., for 2 seconds or 5 seconds, when the worker who is walking overlaps with another worker, for example. To address this issue, the action recognition processing unit 35 sets the threshold value Thre_w to, for example, 2 seconds or 5 seconds. When the time difference between the time t3 and the time t2 indicating the time during which it is difficult to recognize the worker while walking is equal to or less than 2 seconds or equal to less than 5 seconds, the action recognition processing unit 35 recognizes that the worker is in the state of walking during the time difference between the time 3 and the time t2.

In other words, when the time during which it is difficult to recognize the worker is equal to or less than the pre-set time period, the action recognition processing unit 35 recognizes that the action (motion) that had been recognized before the recognition became difficult was continuously performed during the time period. Thus, the action recognition processing unit 35 recognizes that the worker continuously walks during the time period from the walking start time t1 to a shelving start time t4 illustrated in FIG. 16, even when it is difficult to recognize the worker during a certain time period from the walking start time t1 to the shelving start time t4.

Figure 17:
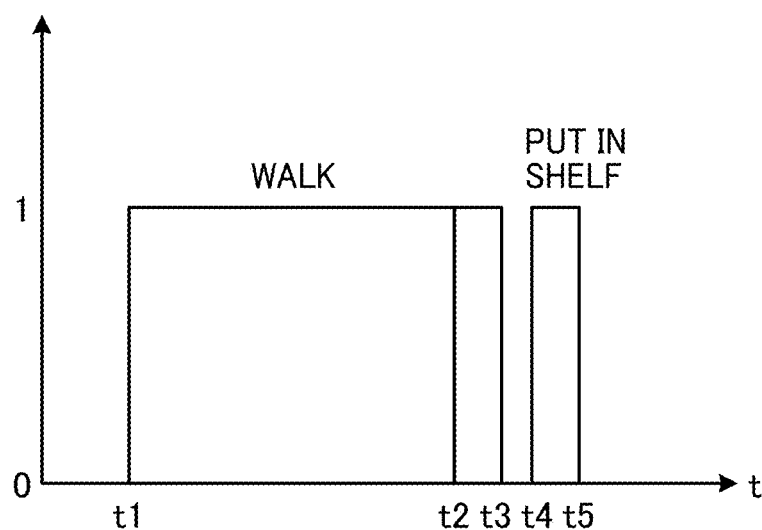
FIG. 17 is a diagram illustrating an example of an action recognition result in which it becomes difficult to detect the worker while the worker is putting an object in a shelf among a series of actions from walking to putting the object in the shelf, according to an embodiment of the present disclosure.

FIG. 17 illustrates an example in which it becomes difficult to recognize the worker temporarily while the worker is performing the shelving action. The difference between the time t3 and the time t4 illustrated in FIG. 17 indicates the time during which it is difficult to temporarily recognize the worker while the worker is performing the shelving action. In substantially the same manner as described above, when the time during which is difficult to recognize the worker equal to or less than the threshold Thre_w such as 2 seconds or 5 seconds, the action recognition processing unit 35 recognizes that the worker continuously performs the shelving action even during the time period when it is difficult to recognize the worker. Thus, the action recognition processing unit 35 recognizes that the worker continuously performs the shelving action during the time period from the shelving start time t2 to a shelving end time 5 illustrated in FIG. 17, even when it is difficult to recognize the worker during a certain time period from the shelving start time t2 to the shelving end time t5.

Thus, when the time during which it is difficult to recognize the worker is equal to or less than the pre-set time period, the action recognition processing unit 35 recognizes that the action (motion) that had been recognized before the recognition became difficult was continuously performed during the time period. Accordingly, even when the recognition of the worker becomes difficult during a certain time period in the middle of work, it is possible to correctly measure the working time.

The recognition result output unit 36 outputs, for each worker, a work start time, a work end time, a work time (a time from start to end of a series of work (motions)=required time), and the like, which are action recognition results, as the action recognition result of each worker.

Identification of State Based on Motion Recognition for Each Part:

Further, the action recognition system according to the embodiment performs the above-described motion recognition operation for each predetermined part of each monitoring target, to recognize a state of each monitoring target based on the motion recognition result of each part. Although the description given above is of an example in which the worker is of the monitoring target, in the following description, a description is given of an example in which the monitoring target is a cow, which is an animal. In other words, the action recognition system according to the embodiment recognizes an action of each cow as described above. Further, the action recognition system according to the embodiment, as described below, recognizes the movement of each cow by dividing each cow into predetermined parts such as a head and a body, and recognizes a state of each cow based on the recognition result of the motion of each part. Although in the following, a description is given assuming that the motion of a plurality of parts such as the head and the body is recognized, the motion may be recognized by one part such as only the head.

Figure 18:
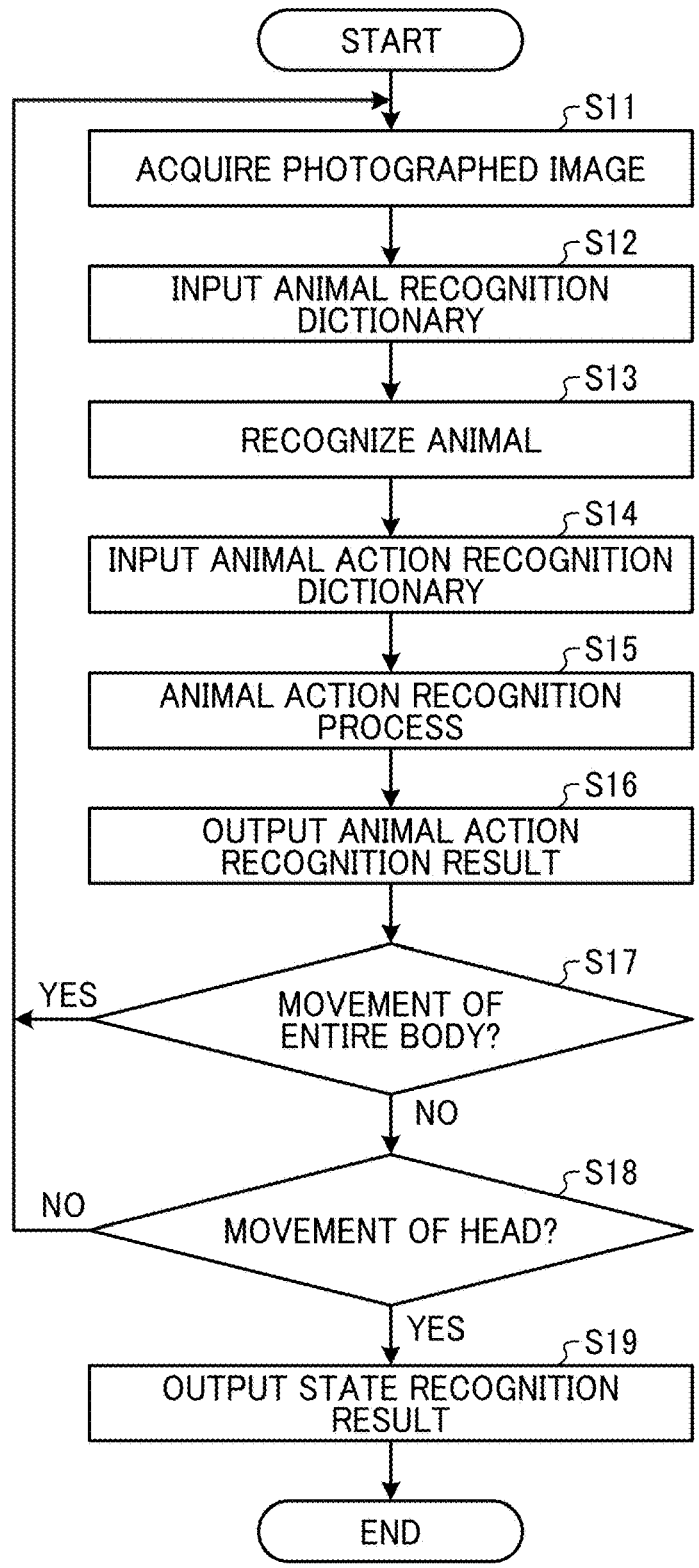
FIG. 18 is a flowchart illustrating an operation of recognizing a state of each cow based on a motion of each part, according to an embodiment of the present disclosure.

FIG. 18 is a flowchart illustrating an operation of recognizing a state of each cow based on a motion of each part. In the case of the flowchart of FIG. 18, since the monitoring target is a cow, which is an animal, the monitoring target recognition dictionary input unit 37 illustrated in FIG. 3 inputs a cow recognition dictionary (animal recognition dictionary) to the recognition unit 32 in step S12. As described below, the animal recognition dictionary is created for each part of the monitoring target, such as for cow head recognition and cow body recognition, and input to the recognition unit 32. In substantially the same manner as described above, the recognition unit 32 recognizes each part of one or a plurality of cows from a captured image acquired in step S1 based on the animal recognition dictionary (step S13).

In substantially the same manner as described above with reference to FIG. 8, the initial ID setting unit 33 assigns an ID for each recognized cow based on an entire image of each cow, and the tracking processing unit 34 performs tracking. In step S14, the action recognition dictionary input unit 38 inputs a dictionary (animal action recognition dictionary) for recognizing animal actions to the action recognition processing unit 35. As described below, the animal action recognition dictionary is created for each part of the monitoring target, such as for cow head recognition and cow body recognition, and input to the action recognition processing unit 35. The action recognition processing unit 35 recognizes the movement of the cow that is successfully tracked for each part such as the head and the body (step S15).

Specifically, the action recognition processing unit 35 extracts a spatiotemporal feature point in an animal rectangular area in each of the captured images of a plurality of frames. More specifically, the action recognition processing unit 35 divides spatiotemporal image data of a spatiotemporal (x, y, t) cube illustrated in FIG. 14 into blocks. The size in the t direction is the number of frames required for motion recognition processing. When a cow moves, a change point occurs in the spatiotemporal image data. The action recognition processing unit 35 detects the spatiotemporal change point in the cube, to recognize the movement of the cow. In this recognition, the action recognition system according to the embodiment recognizes the movement of each part of the cow, such as the head and the body.

Figure 19:
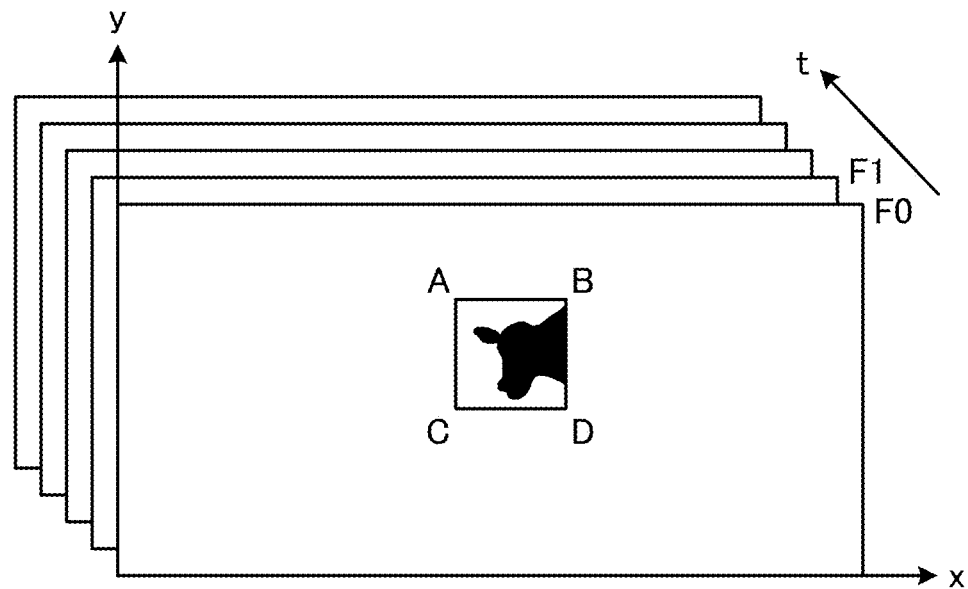
FIG. 19 is a diagram for describing a recognition process of a motion of a head of a cow, performed by the action recognition processing unit, according to an embodiment of the present disclosure.
Figure 20:
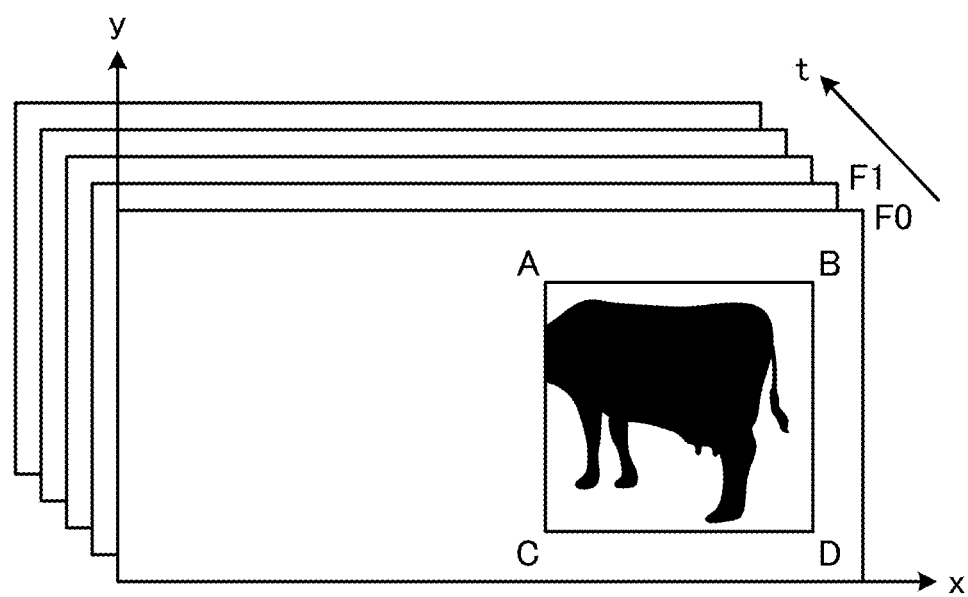
FIG. 20 is a diagram for describing a recognition process of a motion of a body of a cow, performed by the action recognition processing unit, according to an embodiment of the present disclosure.

In other words, a size in the (x, y) direction of the large spatiotemporal cube illustrated in FIG. 14 is a rectangular size corresponding to the recognized cow. When recognizing the movement of a head of a cow, the cube size in the (x, y) direction is a rectangular size of the size of the head of the cow as illustrated in FIG. 19. Further, when recognizing the movement of the body of the cow excluding the head, the cube size in the (x, y) direction is a rectangular size of the body of the cow as illustrated in FIG. 20.

In the spatiotemporal image data having the plurality of blocks, the feature amount (change amount) of a particular block corresponding to a movement of the cow is large. The action recognition processing unit 35 extracts a particular block having a large change amount as a feature point. When extracting the feature point, the action recognition processing unit 35 first extracts a particular block having a feature such as a block having a pattern, in the spatial direction and the (x, y) direction. Further the action recognition processing unit 35 computes the following equation (31), to calculate a pattern intensity of the image.

Equation (31)

$$S_{ij} = \int \frac{\partial^2 f(x, y)}{\partial i \partial j} dxdy \; i, j \in x, y \tag{31}$$

When the calculated pattern intensity is equal to or higher than a predetermined pattern intensity threshold, the action recognition processing unit 35 uses the particular block as a block for extracting the feature point.

In the equation (31), x and y differentials are vertical and horizontal differences within a frame of the captured image. The integral is the sum within the block. Computation of the following equation (32) is performed based on the equation (31), to calculate an effective intensity of luminance pattern (or a contrast of the image).

Equation (32):

$$t = S_{xx}S_{yy} - S_{xy}^2 \tag{32}$$

The action recognition processing unit 35 uses a particular block for which the value of "t" calculated by the equation (32) is equal to or larger than a predetermined threshold value Thre_t as a block for spatiotemporal feature extraction.

More specifically, when extracting a feature point for action recognition of animals such as cows, the action recognition processing unit 35 uses a method that uses the spatiotemporal differential of the image and performs feature extraction of the extracted block having a pattern feature.

That is, it is assumed that a target image f (x,y) is moving at a speed (u,v). Two images $f_1$ (x, y) and $f_2$ (x, y) obtained by photographing this target with a minute time interval Δt satisfy the relationship of the following equation (33).

Equation (33):

$$f_2(x,y)=f_1(x-u\Delta t, y-u\Delta t) \quad (33)$$

When f (x, y) is first-order approximated and partially differentiated with respect to x, y, t, the following equation (34) is obtained.

Equation (34)

$$u\frac{\partial f(x,y)}{\partial x}+v\frac{\partial f(x,y)}{\partial y}+\frac{\partial f(x,y)}{\partial t}\approx 0 \quad (34)$$

The speed (u, v) is calculated using the equation (34). However, the obtained speed has a large measurement error due to the deviation from the first-order approximation, the influence of noise, etc. Assuming that an object moves at a uniform speed in a small area, the above equation (34) needs to be established. When a square integral in the neighborhood of the left side of the equation (34) is used as an evaluation function and the square integral is minimized, the speed (u, v) is calculated by the flowing equations (35) and (36).

Equation (35)

$$u=\frac{S_{yt}S_{xy}-S_{xt}S_{yy}}{S_{xx}S_{yy}-S_{xy}^2} \quad (35)$$

Equation (36)

$$v=\frac{S_{xt}S_{xy}-S_{yt}S_{xx}}{S_{xx}S_{yy}-S_{xy}^2} \quad (36)$$

By this computation, the shift amount of the block between frames is set to equal to or less than a pixel. $S_{ij}$ is defined by the equation (31).

To summarize the action recognition operation by the action recognition processing unit 35 as described above, the action recognition processing unit 35 performs animal action recognition with the spatiotemporal cube for action recognition illustrated in FIG. 14. The spatiotemporal feature in a small block of the spatiotemporal cube is the movement amount (u, v) of the block between frames. The spatiotemporal feature amount of the (i, j, t)-th block is $(u_{ijt}, v_{ijt})$. On the other hand, the feature amount $(u_{ijt}, v_{ijt})$ of a block having no pattern is (0, 0).

Further, the action recognition processing unit 35 one-dimensionally develops the block movement amount (u, v) obtained in the small blocks in the large cubic as the action recognition target, to create a feature vector V ( . . . , $U_{ijt}$, $v_{ijt}$ . . . ). The number of elements of this feature vector is twice the number of the small blocks.

The animal recognition dictionary input from the monitoring target recognition dictionary input unit 37 and the animal action recognition dictionary input from the action recognition dictionary input unit 38 are created by detecting the feature vector as described above for each part such as a head and a body of an animal such as a cow.

The action recognition processing unit 35 recognizes a motion for each part such as the head and the body of the cow (entire body) by using this feature vector, based on the above-described SVM machine learning method (steps S16 to S18), to output the recognition result of the specific action and actions other than the specific action.

Figure 21A:
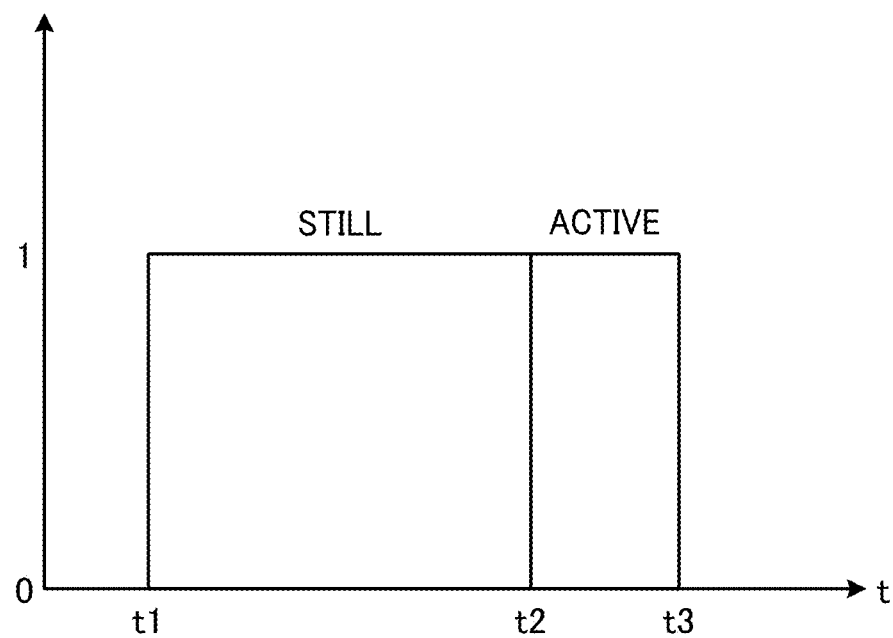
FIGS. 21A and 21B are diagrams for describing a recognition process of a state of a cow based on a motion of each part of the cow, performed by the action recognition processing unit, according to an embodiment of the present disclosure.
Figure 21B:
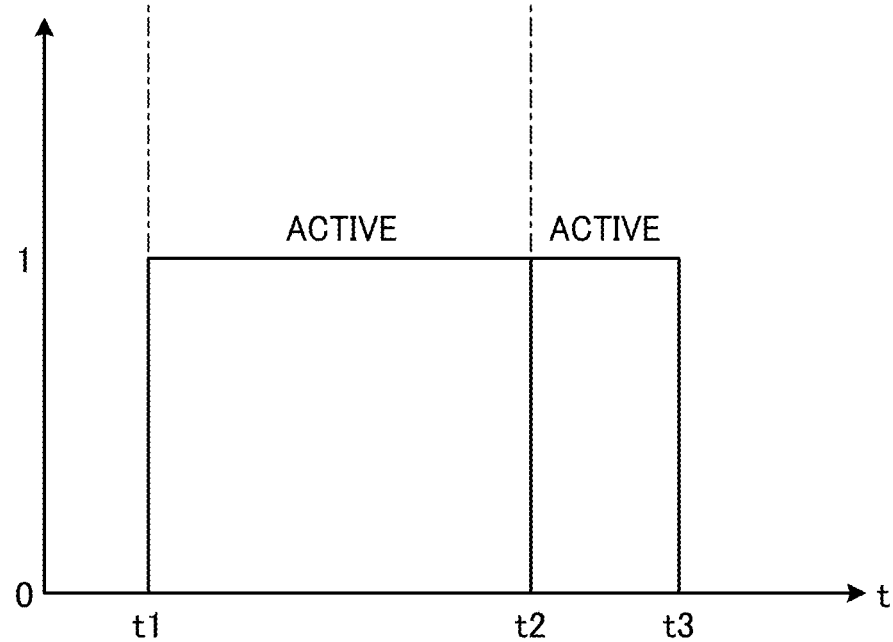

Further, when performing the recognition of motion, the action recognition processing unit 35 recognizes the stillness and activity of the head of the cow and the stillness and activity of the body (entire body). FIG. 21A illustrates each time of the stillness and activity of the cow's body. On the other hand, FIG. 21B illustrates each time of the stillness and activity of the cow's head (entire body). The example of FIG. 21A indicates that the cow's body was still from time t1 to time t2, and was in active state from time t2 to time t3. The example of FIG. 21B indicates that the cow's head was in an active state both from the time t1 to the time t2 and from the time t2 to the time t3.

The action recognition processing unit 35 comprehensively determines the motion of each part of the cow and recognizes the state of the cow. For example, from the time t1 and time t2 in FIGS. 21A and 21B, the body part of the cow is still, but the head part is active. In this case, the action recognition processing unit 35 recognizes that the cow was in a state of chewing from the time t1 and the time t2. Further, from the time t2 to time t3 in FIGS. 21A and 21B, the body part and the head part of the cow are active. In this case, the action recognition processing unit 35 recognizes that the cow was in a walking state from the time t2 to the time 3.

Note that, in substantially the same manner as described above with reference to FIGS. 16 and 17, when a time period during which it is difficult to recognize each part of the cow is equal to or less than a pre-set time period, the action recognition processing unit 35 recognizes that the action that had been recognized before the recognition became difficult was continuously performed during the time period. Accordingly, even when the recognition of the cow becomes difficult during a certain time period in the middle of the recognition operation, the action recognition processing unit 35 recognizes that the same motion was performed before and after the recognition became difficult.

The recognition result output unit 36 outputs, to the monitor apparatus 23, the server apparatus 22 or the like, state recognition information as described above, which is a state recognition result of the cow, the stillness of the motion, the motion start time, the motion end time, and the duration of the movement of the entire body of each cow, and the stillness of the motion, the motion start time, the motion end time, and the duration of the movement of the each part of the cow, and the like, as the action recognition result of each cow. By comprehensively recognizing the state of the cow based on the motion of each part of the cow as described heretofore, the state of the cow is recognized with higher accuracy.

For the monitoring target other than the cow, such as the worker, the motion of each worker is recognized for each of plural parts such as the head and the body of the worker, and based on the recognition result of the motion of the head and the recognition result of the motion of the body, the state of the worker (during meal, shelving a product, walking, etc.) may be recognized.

As described heretofore, the action recognition system according to the embodiment recognizes each monitoring target based on the captured images of the monitoring targets such as a plurality of workers and assigns the IDs to the monitoring targets respectively. Each monitoring target is tracked based on the assigned ID, and when it becomes difficult to recognize a particular monitoring target, the action recognition system maintains the ID and related information (position information and image data) of the particular monitoring target of which recognition becomes difficult. In this state, the action recognition system computes the above equation (21), to calculate the similarity of the particular monitoring target of which recognition becomes difficult, that has become difficult to recognize and the similarity of each of the monitoring targets that are re-recognized. Then, the action recognition system assigns the ID of the particular monitoring target of which recognition becomes difficult to the monitoring target that has the closest similarity to the particular monitoring target of which recognition becomes difficult among the monitoring targets that are re-recognized.

This enables the action recognition system to recognize a plurality of monitoring targets at the same time, and even in a case in which some or all of the monitoring targets become temporarily difficult to be recognized, when performing re-recognition of the monitoring targets, to assign the same IDs that were assigned to the monitoring targets before the recognition became difficult to the monitoring targets, thereby enabling tracking the monitoring targets. Accordingly, the plurality of monitoring targets is monitored with high accuracy.

Further, the action recognition system according to the embodiment extracts the spatiotemporal feature point of the monitoring target area from a captured image of a plurality of frames, and detects a feature amount corresponding to an action (motion) of each monitoring target based on the extracted spatiotemporal feature point. Further, the action recognition system recognizes the action (motion) of each monitoring target based on the detected feature amount, and outputs, for example, the action start time, the action end time, and the required time of each monitoring target as a recognition result. Furthermore, the action recognition system outputs state information indicating a state of each monitoring target determined based on a motion of each part of each monitoring target as a recognition result. This visualizes actions of the plurality of monitoring targets.

Still further, the action recognition system divides each of a single or a plurality of monitoring targets into a plurality of parts such as a head and a body, recognizes a motion for each of the plurality of parts, and recognize a state of the monitoring target(s) based on the recognition result of the motion of each part. Accordingly, the state of the monitoring target(s) is comprehensively recognized based on the motion of each part of the monitoring target(s). Thereby, the state of the monitoring target(s) is recognized with higher accuracy.

Moreover, for example, by using an output of a triaxial acceleration sensor attached to a cow's neck or the like, a more detailed motion of the cow's head is detected with high accuracy. Further, since recognition of an entire body of a cow can be detected accurately even by an image recognition process, the motion of the head of the cow may be detected by the above-mentioned acceleration sensor or the like, and the motion of the entire body of the cow may be detected based on the image.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

For example, although the description of the embodiment given above is of an example in which the monitoring target is the worker, the monitoring target can be any other suitable object such as an animal, a passerby on a road, a person gathered at a particular place, and a robot. The same effect as described above can be obtained also in this case.

The conventional person action determination device according to the related art recognizes the monitoring target based on a movement of the monitoring target in its entirety. Accordingly, although the conventional device can recognize the monitoring target itself, it is difficult to recognize the state of the monitoring target.

According to the embodiment, a state recognition apparatus, a state recognition method, and a non-transitory computer-readable medium storing program are provided that recognize a state of a monitoring target.

Further, the embodiment and modifications thereof are included in the scope and gist of the present disclosure, and are included in the scope of claims and the equivalent scope thereof.

Each of the functions of the described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

What is claimed is:

1. A state recognition apparatus comprising:
circuitry configured to:
recognize a plurality of monitoring targets based on a captured image;
assign an identification number to each of the plurality of monitoring targets that are recognized;
based on an area of each of the plurality of monitoring targets recognized in the captured image, track each of the plurality of the monitoring targets that is recognized in the captured image and to which the identification number is assigned;
recognize a motion of each of the plurality of monitoring targets for the each part, in a result area of the captured image in which each of the plurality of monitoring targets are tracked;
recognize a state of each of the plurality of monitoring targets based on the recognized motion of the each part; and
output a state recognition result indicating the recognized states of the plurality of monitoring targets.

2. The state recognition apparatus of claim 1, wherein
the monitoring targets recognized based on the captured image by the circuitry are a plurality of animals, and
the circuitry is further configured to:
recognize a motion of an entire body of each of the plurality of animals and a motion of a part of the entire body of the each of the plurality of animals; and
assign the identification number to each of the plurality of animals that are recognized, based on the captured image of the entire body of each of the plurality of animals.

3. The state recognition apparatus of claim 2, wherein the circuitry is further configured to output, as the state recognition result, either one of a stillness of the motion and a duration of movement of the entire body of each of the plurality of animals and either one of a stillness of the motion and a duration of movement of the part of the entire body of each of the plurality of animals.

4. The state recognition apparatus of claim 1, wherein the circuitry is further configured to, when a time period that the tracking of the monitoring target was difficult is less than or equal to a pre-set time period in a series of motions of the monitoring target, output the state recognition result indicating that the circuitry recognizes the series of motions was continued even during the time period when the tracking was difficult.

5. The state recognition apparatus of claim 1, wherein the circuitry is further configured to maintain the identification number, position information and image information of the monitoring target, and update the position information and the image information when tracking is successful.

6. The state recognition apparatus of claim 1, wherein the circuitry is further configured to:
maintain the identification number, position information, and image information of the monitoring target that has become difficult to be tracked;
calculate a degree of similarity of the monitoring target that has become difficult to be tracked and calculate degrees of similarity of one or more of the plurality of monitoring targets for which re-recognition is performed when tracking became difficult; and
when the degree of similarity of each of the one or more of the plurality of monitoring targets that are re-recognized by the re-recognition is close to the similarity of the monitoring target that has become difficult to be tracked, assign a same identification number as the identification number that was assigned to the monitoring target that has become difficult to be tracked.

7. The state recognition apparatus of claim 1, wherein the circuitry is further configured to extract a spatiotemporal feature point from the captured image of a plurality of frames, and recognize a motion of the monitoring target based on the extracted spatiotemporal feature point.

8. A state recognition method comprising:
recognizing a plurality of monitoring targets based on a captured image;
assigning an identification number to each of the plurality of monitoring targets that are recognized;
based on an area of each of the plurality of monitoring targets recognized in the captured image, tracking each of the plurality of the monitoring targets that is recognized in the captured image and to which the identification number is assigned;
recognizing a motion of each of the plurality of monitoring targets for the each part, in a result area of the captured image in which each of the plurality of monitoring targets are tracked;
recognizing a state of each of the plurality of monitoring targets based on the recognized motion of the each part; and
outputting state information indicating the recognized states of the monitoring target as a state recognition result of the plurality of monitoring targets.

9. A non-transitory computer-readable medium storing a program storing instructions which, when executed by a computer, causes the computer to:
recognize a plurality of monitoring targets based on a captured image;
assign an identification number to each of the plurality of monitoring targets that are recognized;
based on an area of each of the plurality of monitoring targets recognized in the captured image, track each of the plurality of the monitoring targets that is recognized in the captured image and to which the identification number is assigned;
recognize a motion of each of the plurality of monitoring targets for the each part, in a result area of the captured image in which each of the plurality of monitoring targets are tracked;
recognize a state of each of the plurality of monitoring targets based on the recognized motion of the each part; and
output state information indicating the recognized state of the monitoring target as a states recognition result of the plurality of monitoring targets.

10. The state recognition apparatus of claim 1, wherein the circuitry is further configured to maintain the identification number, position information, and image information of the monitoring target.

11. The state recognition apparatus of claim 1, wherein the circuitry is further configured to:
maintain the identification number, position information, and image information of the monitoring target that has become difficult to be tracked.

* * * * *